US006935050B2

(12) United States Patent
Bookbinder et al.

(10) Patent No.: US 6,935,050 B2
(45) Date of Patent: Aug. 30, 2005

(54) METHOD AND APPARATUS REDUCING METAL IMPURITIES IN OPTICAL FIBER SOOT PREFORMS

(75) Inventors: Dana C. Bookbinder, Corning, NY (US); Richard M. Fiacco, Corning, NY (US); Cynthia B. Giroux, Corning, NY (US)

(73) Assignee: Corning Incorporated, Corning, NY (US)

( * ) Notice: Subject to any disclaimer, the term of this patent is extended or adjusted under 35 U.S.C. 154(b) by 137 days.

(21) Appl. No.: 10/698,494

(22) Filed: Oct. 31, 2003

(65) Prior Publication Data

US 2004/0107596 A1 Jun. 10, 2004

Related U.S. Application Data

(60) Provisional application No. 60/431,072, filed on Dec. 4, 2002.

(51) Int. Cl.[7] .................................................. F26B 5/04

(52) U.S. Cl. ................................ 34/416; 34/80; 34/82; 65/422

(58) Field of Search .......................... 34/329, 416, 448, 34/472, 60, 61, 62, 72, 79, 80, 82; 65/422, 428; 428/35.8; 424/423

(56) References Cited

U.S. PATENT DOCUMENTS

| | | | | |
|---|---|---|---|---|
| 3,933,454 A | * 1/1976 | DeLuca | ....................... | 65/422 |
| 3,938,974 A | 2/1976 | Macedo et al. | ............... | 65/3 R |
| 4,629,485 A | * 12/1986 | Berkey | ........................ | 65/398 |
| 4,910,009 A | 3/1990 | Sommers | .................... | 423/492 |
| 4,979,971 A | 12/1990 | Kyoto et al. | ................. | 65/3.12 |
| 5,090,980 A | 2/1992 | Clasen | ....................... | 65/3.12 |
| 6,319,550 B1 | 11/2001 | Campion et al. | ........... | 427/215 |
| 2002/0044334 A1 | 4/2002 | Battilana et al. | ............ | 359/333 |
| 2004/0139765 A1 * | 7/2004 | Hirano et al. | ................. | 65/412 |

FOREIGN PATENT DOCUMENTS

| | | | |
|---|---|---|---|
| EP | 0405580 | 6/1990 | ......... C03B/37/012 |
| EP | 0529694 | 6/1990 | ......... C03B/37/014 |
| EP | 0 331 483 | 5/1993 | ............. C03C/1/00 |
| EP | 0 765 845 | 4/1997 | ......... C03B/37/014 |
| EP | 0968972 | 1/2000 | ......... C03B/37/016 |

OTHER PUBLICATIONS

Japan Abstract w/ JP Patent No. 02153815 entitled "Purifcation of Chloropolysilane" published Jun. 13, 1990, attached; Inventors: Ogi Katsumi and Kimura Etsuji.

Japan Abstract w/ JP Patent No. 55010412 entitled "Production of Anhydrous Glass Base Material for Optical Fiber" published Jan. 24, 1980, attached; Inventor: Edahira Takao.

Japan Abstract w/ JP Patent No. 62153134 entitled "Production of Glass Material for Optical Transmission" published Jul. 8, 1987, attached; Inventor: Kuroba Toshiaki.

Encylopedia of Chemical Technology, Fourth Edition, A Wiley–Interscience Publication, *Molecular Sieves*, vol. 16, pps. 888–925, 1995.

Schultz, "Optical Absorption of the Transition Elements in vitreous Silica", Journal of The American Ceramic Society, vol. 57, No. 7, pps. 309–312, 1974.

* cited by examiner

*Primary Examiner*—Stephan Gravini
(74) *Attorney, Agent, or Firm*—Svetlana Z. Short

(57) ABSTRACT

A method and apparatus for producing an optical fiber preform including a metal remover, which operates by adsorption, that removes gaseous transition metal impurities present in a process gas to be provided to a furnace for drying, doping or consolidation. The apparatus and method may reduce attenuation of the resultant optical fiber drawn from the preform.

29 Claims, 1 Drawing Sheet

METHOD AND APPARATUS REDUCING METAL IMPURITIES IN OPTICAL FIBER SOOT PREFORMS

RELATED APPLICATIONS

The present invention claims priority to, and the benefit of, U.S. patent application Ser. No. 60/431,072 filed Dec. 4, 2002.

BACKGROUND OF THE INVENTION

1. Field of the Invention

The present invention relates generally to methods and apparatus for manufacturing optical fiber preforms, and particularly to purifying process gases to remove transition metal impurities therein.

2. Technical Background

Typically, in the process of manufacturing optical fiber, the first step is manufacturing of an optical fiber preform. In such preforms manufactured by for example Outside Vapor Deposition (OVD) methods, the preform first takes the form of a soot blank. The soot blank is formed by depositing layers of silica-containing soot by flame deposition onto a rotating deposition surface, such as a generally cylindrical core cane or mandrel. U.S. Pat. No. 3,933,454 describes a suitable method for forming a soot preform. The soot preform is than dried by placing it into the heated chamber of a consolidation furnace and subjecting the soot preform to a temperature between about 850 and 1150° C. in a drying gas atmosphere. The drying atmosphere typically includes a chlorine-containing gas, such as $Cl_2$. U.S. Pat. No. 4,165,223 teaches an exemplary method for appropriately drying and consolidating a soot preform.

Once dried, the soot preform may be subjected to doping. Doping raises or lowers the refractive index of one or more portions of the preform, as compared to pure silica. Typically preforms may be doped with fluorine, for example, by subjecting the soot preform to a fluorine-containing gas such as $CF_4$, $C_2F_6$, $C_2F_2Cl_2$, $SF_6$ or $SiF_4$ for a sufficient time s fluorine diffuses into the interstices of the preform. U.S. Pat. No. 4,629,485 to Berkey describes a method of making a fluorine-doped optical fiber preform.

Once sufficiently dried and/or doped, the soot blank is subjected to an elevated temperature of between about 1250–1600° C. (depending upon dopant concentration) until the soot blank vitrifies and produces a consolidated glass preform. This consolidated preform is then placed into a chamber of a draw furnace and drawn into optical fiber by conventional methods. Alternatively, the consolidated preform may be redrawn in a furnace to form a cylindrical core cane rod, a segment of which then becomes the deposition surface for further deposition steps before being dried and consolidated again such that optical fiber can be drawn therefrom.

The attenuation of the optical fiber produced from such preforms is particularly important property, with even small attenuation reductions, as low as 0.0001 dB/km, being considered significant. Previous efforts have focused on providing, directly from the manufacturer, raw materials having impurities in the ppb range. However, even given this very low level of impurities, it is still desirable to further improve prior art processes such that optical fiber with even lower attenuation may be produced.

SUMMARY OF THE INVENTION

In accordance with embodiments of the invention, a method of manufacturing an optical fiber preform is provided, comprising the steps of providing a process gas, purifying the process gas, by adsorption, to remove transition metal impurities therein without causing a chemical conversion reaction during purifying, and exposing, in a furnace, an optical fiber soot preform to the purified process gas. The step of exposing may take place during drying, doping or consolidating of the soot preform. Preferably, the process gas that is purified comprises a halogen-containing gas, such as a chlorine- or fluorine-containing gas. More preferably, the process gas comprises a mixture of a halogen-containing gas and an inert gas. The purification step preferably removes at least some metal contaminants present in the process gas thereby minimizing subsequent exposure of the soot blank to transition metal impurities (e.g., iron-, nickel-, chromium- and copper-containing compounds). Consequently, since the process gas includes lesser amounts of impurities, there may be a desirable decrease in fiber attenuation.

In a preferred embodiment, the step of purifying comprises passing the process gas through a porous media, preferably comprising a metal oxide wherein the metal is selected from the group consisting of metals from Group IA, IIA, IIIB, and IVB of the periodic table of the elements, Zn, B, Al, Si and P. Zeolites are a particularly preferred adsorbent in one aspect of the invention. Preferably also, the step of purifying comprises adsorption at a temperature below about 200° C.; most preferably at about room temperature.

In another embodiment, the present invention is an optical fiber preform manufacturing apparatus, comprising a source of process gas, a metal remover (otherwise referred to herein as a metal adsorber) connected to the source and adapted to purify the process gas and remove transition metal impurities therein without causing a chemical conversion reaction during purifying, and a furnace connected to the metal remover, the furnace adapted to contain a soot preform. Preferably the metal remover comprises a porous media, such as, for example, a metal oxide. Metal oxides where the metal is selected from the group consisting of Mg, Ca, Al, Si, Ti, and Zr are particularly preferred. Most preferably, the metal remover comprises an adsorbent material that promotes adsorption, such as a zeolite for example.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
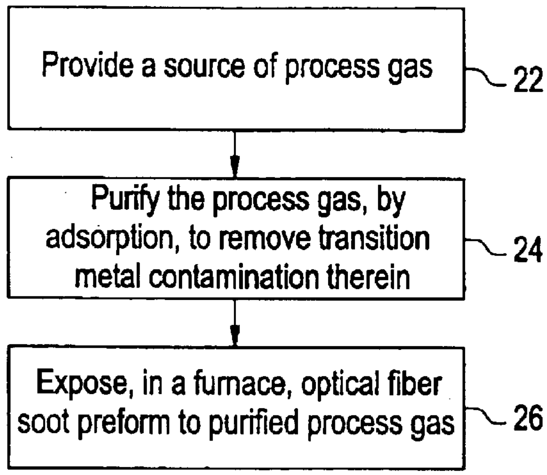
FIG. 1 is a flow diagram of a method according to the present invention.

Reference will now be made in detail to the present preferred embodiments of the invention, examples of which are illustrated in the accompanying drawings. Whenever possible, the same reference numerals will be used throughout the drawings to refer to the same or like parts. One embodiment of a method for manufacturing an optical fiber preform of the present invention is illustrated in the block diagram of FIG. 1.

In accordance with the aforementioned embodiment of the invention, a method of manufacturing an optical fiber preform is provided comprising, as best shown in FIG. 1, the steps of providing a source of process gas as shown in block 22, purifying, by adsorption, the process gas to remove transition metal impurities therein as shown in block 24, and exposing, in a furnace, an optical fiber soot preform to the purified gas as shown in block 26. The exposure step may be accomplished during the process of-drying the soot preform, during the process of doping the soot blank with either chlorine or fluorine, for example, or during consolidation of the soot blank to vitrify the same.

It has been discovered by the inventors herein, that although the raw gases (e.g., $Cl_2$) provided by the manufacturer/supplier are theoretically suitable for making low attenuation fiber (because of the low levels of impurities), because of the presence of small amounts of water and corrosive gases, that metal contaminants may be formed in the distribution apparatus (tanks, valves' lines). Consequently, these contaminants formed may be gaseous and become included in the interstices of the soot preform. As such, it should be recognized that even though the initial process gas may be of sufficient purity to produce low attenuation fiber, the gas received at the furnace, indeed, may not be, and may include transition metal impurities which may cause unwanted attenuation increases in the optical fiber. Several hypothesized reactions that may take place to form the metal chloride or metal oxide transition impurities in the manufacturing process are shown in equations 1–5 below.

$$3H_20 + 2Fe \xrightarrow{\text{Acid Catalyst}} Fe_2O_3\,(\text{solid}) + 3H_2 \quad \text{Equation 1}$$

$$6HCl+Fe_2O_3 \rightarrow 2FeCl_3\ (\text{gas})+3H_2O \quad \text{Equation 2}$$

$$2H_2O+8Cl_2+2Fe_2O_3 \rightarrow 4FeCl_3\ (\text{gas})+4HCl+4O_2 \quad \text{Equation 3}$$

$$4H_2O+3Fe \rightarrow Fe_3O_4\ (\text{solid})+4H_2 \quad \text{Equation 4}$$

$$6HCl+Fe_3O_4 \rightarrow FeCl_2\ (\text{solid})+2FeCl_3\ (\text{gas})+4H_2O \quad \text{Equation 5}$$

The inventors herein believe that both solid and gaseous transition metal impurities may contribute to unwanted contamination of the soot blank. Solid impurities have the propensity to create gaseous transition metal impurities. Thus, it is important to remove contaminants from the process gas at some point in the process prior to flowing the process gas into the furnace. In particular, ferric oxide (a solid) is formed any time there is iron in the delivery system in the presence of water as is illustrated in the reaction equation 1. This solid, ferric oxide, once formed in the delivery system, can then be converted into a metal chloride gas such as ferric chloride, through a number of reactions as are illustrated in equations 2–3 above. In particular, ferric oxide when in the presence of a corrosive, such as hydrochloric acid or chlorine gas and water may convert into an iron-containing gas (such as ferrous chloride). Likewise, as shown in equation 4, iron in the presence of water may form an iron-containing compound such as ferrous oxide. These iron-containing gases can freely move throughout the delivery system with the process gas and into the interstices of the soot blank thereby contaminating the soot blank with iron. These iron contaminants become trapped in the glass upon consolidation. Even very small amounts of such iron contaminants (in the ppb range) in the soot blank can cause unwanted attenuation in the fiber produced therefrom. Other metal contaminants may be included with the process gas due to similar corrosion reactions in the delivery system.

Figure 2:
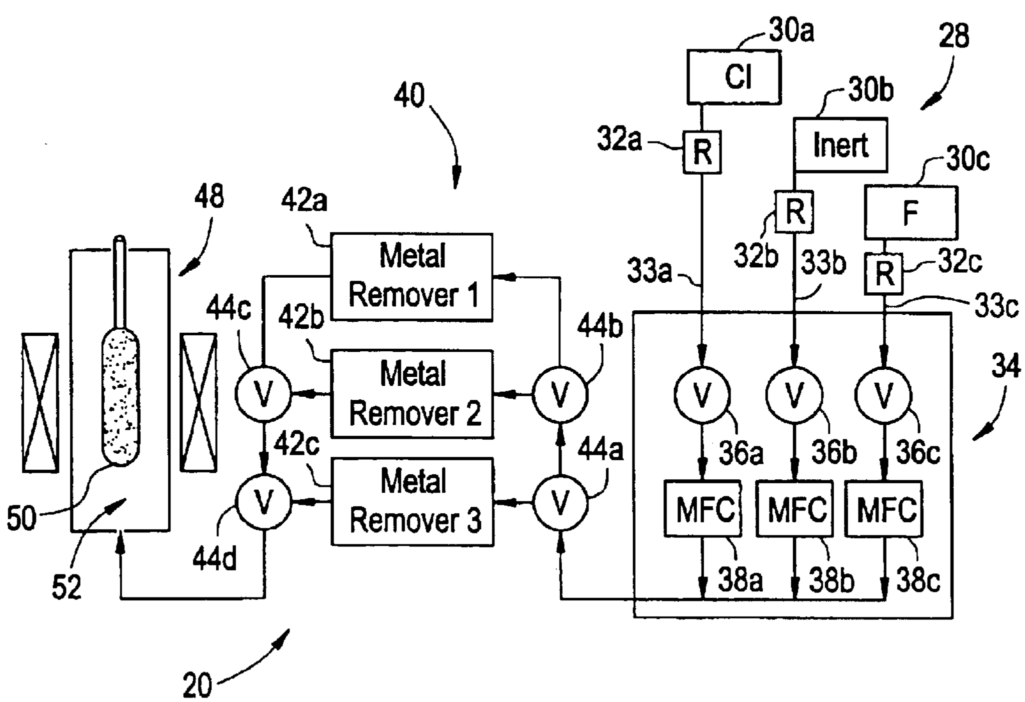
FIG. 2 is a block diagram of an apparatus in accordance with the invention.

To combat this unwanted contamination, the inventors herein have invented, as described herein, an optical preform manufacturing apparatus 20 whereby the process gas is suitably purified by a metal remover 40 (otherwise referred to herein as a metal adsorber) to remove effective amounts of gaseous metal impurities therein and purify the process gas prior to delivering it to the furnace 48 housing the soot preform 50. In particular, as shown in the apparatus of FIG. 2, it is desirable to locate the metal removing adsorber 40 in close proximity to the furnace 48, if possible. Most preferably, the metal removing adsorber 40 is positioned between the furnace 48 and the process gas distributor 34.

The metal remover 40 operates by the principle of adsorption. Adsorption is the ability of a material (the adsorbent) to hold or concentrate gases, liquids or dissolved substances upon its surface. In particular, a region of low potential energy is formed near the surface of the adsorbent material included in the adsorber 40 and the molecular density of the solid adsorbent is generally greater than that of the bulk process gas to be purified. As such, the adsorbent can remove trace amounts of impurities in the bulk process gas.

The apparatus 20 in accordance with an embodiment of the invention comprises a source of process gas 28 that originates from one or more vessels or tanks 30*a*, 30*b*, 30*c* including pressure regulators 32*a–c* operable with each tank to control the outlet line pressure. The tanks store the various raw materials (e.g., chlorine-containing gas (for clarity designated Cl), the fluorine-containing gas (for clarity designated F), and inert gas (for clarity designated Inert)) under pressure. As such, some of the raw materials may constitute liquids, in the "as stored" condition. However, as they are released in lines 33*a–c* they become gases, hence they each, alone or in combination, comprise a source of process gas 28. The source of process gas 28 is connected to a distributor 34 which functions to control the flow rate of the various process gases in the apparatus 20. The distributor 34 includes a collection of control valves 36*a–c* and Mass Flow Controllers (MFCs) 38*a–c* which together operate and function to control the flow rate of the individual process gasses (Cl, F, Inert) to the metal remover (adsorber) 40 and the furnace 48. It should be recognized that the valves may be optional if the MFCs can adequately completely shut off the flow when desired. Likewise, any alternative valving system may be employed to control the flow of process gasses to the metal remover 40.

Connected to the distributor 34 and to the process gas source 28 is a metal remover (metal adsorber) 40 that operates to remove trace amounts of transition metal impurities in the process gas received thereat. Preferably, the metal adsorber 40 is comprised of at least one metal removing adsorber, such as metal remover 1 (42*a*), but more preferably includes at least two metal removing adsorbers. Metal remover 1 (42*a*) operates and functions to remove metal impurities in the process gas flow by the process of adsorption. One suitable metal remover is NANOCHEM® purifier, model L-500-MTX, available from Matheson Tri-Gas, Semi-Gas division of San Jose, Calif.

Supplied to the metal remover 1 (42*a*) is a process gas, which preferably comprises a halogen-containing gas. In particular, the process gas preferably comprises a chlorine-containing gas, such as $Cl_2$ from the tank 30*a*; and more preferably a mixture of a halogen-containing gas such as $Cl_2$ and an inert gas such as helium, from tanks 30*a* and 30*b*, respectively. The soot blank 50 is initially placed in the walled chamber 52 of the furnace 48, and the first process step employed is to dry the soot blank 50 to remove any water or hydroxyl ions from the interstices of the soot blank 50. Drying is accomplished by providing to the furnace 48 the process gas mixture that comprises a mixture of about 95–99% inert gas, preferably helium, and about 1–5% chlorine-containing gas, preferably $Cl_2$. Suitable alternative chlorine-containing gases for drying comprise $POCl_3$, $SiCl_4$, $GeCl_4$, $COCl_2$ and $SOCl_2$. Any of these drying gases may be used in place of the preferred $Cl_2$. A suitable alternative inert gas is argon. The drying temperature is preferably between about 850 and 1250° C. for between about 0.2 and 10 hours, depending upon blank size.

Passing the process gas mixture comprising an inert gas and a chlorine-containing gas through the metal remover 1 (42*a*) is accomplished by appropriately opening and closing 3-way valves 44*a*–44*d* and controlling valves 36*a*, 36*b* and MFCs 38*a*, 38*b*. This exposes the process gas mixture to the adsorbent material contained in the metal remover 1 42*a* such that the adsorbent preferably removes an effective amount of any gaseous metal-containing contaminant contained in the process gas by the process of adsorption. The process of adsorption for several adsorbent materials may take the form of equation 6–9 below, for example. In particular, adsorption is by way of complex electron donation of oxygen to the contaminant. The four dots are indicative of an adsorption bond. In each of the cases shown in FIGS. 6–9 below, ferric chloride ($FeCl_3$) gas is the contaminant gas removed from the process gas by the process of adsorption.

$$FeCl_3\ (gas)+SiO_2.Al_2O_3\ (zeolite)\rightarrow Cl_3Fe\ ....\ OSiOAl_2O_3 \qquad \text{Equation 6}$$

Other examples of adsorption process are shown in equations 7–9 below.

$$FeCl_3\ (gas)+MgO\rightarrow Cl_3Fe\ ....\ OMg \qquad \text{Equation 7}$$

$$FeCl_3\ (gas)+CaO\rightarrow Cl_3Fe\ ....\ OCa \qquad \text{Equation 8}$$

$$FeCl_3\ (gas)+SiO_2\rightarrow Cl_3Fe\ ....\ O_2Si \qquad \text{Equation 9}$$

Other metal-containing gases that may be included in the process gas as a contaminant such as $NiCl_2$ (nickel chloride), CuCl or $CuCl_2$ (copper chloride), $CrCl_3$ (chromic chloride), $MnCl_2$ (manganous chloride), $CoCl_2$ (cobaltous chloride), $VCl_3$ (vanadium trichloride), and $TiCl_4$ (titanium tetrachloride) for example. These metal-containing contaminants, if present in the process gas, may also be removed by adsorption. Although these metal-containing compounds are normally solids at room temperature, there is a small percentage that exists in the vapor phase. Although certain exemplary contaminant gases are shown herein, it should be recognized that other contaminant gases may be removed by the adsorption process described herein as well, such as metal oxychlorides, for example $CrOCl_2$ (chromium oxychloride). Moreover, where fluorine containing gases are used as the process gas, the contaminant gas formed in the deliver system may be a metal fluoride, such as $FeF_2$ or $FeF_3$ (iron fluorides), CuF or $CuF_2$ (copper fluoride), $NiCl_2$ (nickel fluoride), $CrF_2$ (chromium fluoride) or a metal oxyfluoride such as$CrOF_2$ (chromium oxyfluoride), for example. These contaminant gases may be removed by the process of adsorption by passing the process gas containing theses contaminant gases through a metal removing adsorber 40 including an adsorbent material therein (See exemplary equations 10–16 below).

$$NiCl_2\ (gas)+SiO_2.Al_2O_3\ (zeolite)\rightarrow Cl_2Ni\ ....\ OSiOAl_2O_3 \qquad \text{Equation 10}$$

$$CuCl_2\ (gas)+SiO_2.Al_2O_3\ (zeolite)\rightarrow Cl_2Cu\ ....\ OSiOAl_2O_3 \qquad \text{Equation 11}$$

$$CrCl_3\ (gas)+SiO_2.Al_2O_3\ (zeolite)\rightarrow Cl_3Cr\ ....\ OSiOAl_2O_3 \qquad \text{Equation 12}$$

$$MnCl_2\ (gas)+SiO_2.Al_2O_3\ (zeolite)\rightarrow Cl_2Mn\ ....\ OSiOAl_2O_3 \qquad \text{Equation 13}$$

$$CoCl_2\ (gas)+SiO_2.Al_2O_3\ (zeolite)\rightarrow Cl_2Co\ ....\ OSiOAl_2O_3 \qquad \text{Equation 14}$$

$$VCl_3\ (gas)+SiO_2.Al_2O_3\ (zeolite)\rightarrow Cl_3V\ ....\ OSiOAl_2O_3 \qquad \text{Equation 15}$$

$$TiCl_4\ (gas)+SiO_2.Al_2O_3\ (zeolite)\rightarrow Cl_4Ti\ ....\ OSiOAl_2O_3 \qquad \text{Equation 16}$$

Although shown using a zeolite material as the adsorbent, other alternative adsorbent materials described herein may be employed as well.

When such process gases have been purified by adsorption, the soot preform 50 is subjected to cleaner process gas and, therefore, the propensity of the soot preform to become contaminated with metals during the drying is reduced. Optionally, a chlorine-containing gas purified in accordance with the invention herein may also be used to dope the preform with chlorine, if desired. In the case of chlorine doping, a mixture of 5% to 50% chlorine and 50% to 95% helium may be employed. Alternatively, $POCl_4$, $SiCl_4$, and $GeCl_4$ or the like may be used as chlorine-containing dopant gases. These gases may be purified as well by passing them through such metal removing adsorbers just prior to providing the gases to the furnace. In this way, the dopant gases are purified and are less likely to contaminate the preform 50 during the doping process. Thus, it should be recognized that removing metal impurity gases from the dopant gases by adsorption is beneficial and may therefore reduce attenuation of the fiber drawn from the preform.

Metal remover 2 (42*b*) is of the same structural makeup as metal remover 1 (42*a*) except that it operates and functions to purify a different process gas (or gas mixture) than the gas supplied to 42*a*. For example, the metal remover 2 (42*b*) may be connected to the source of process gas 28 that is a fluorine-containing compound, such as $CF_4$ for example. More preferably, the metal remover is operatively connected to a mixture of fluorine-containing gas and inert gas, for example from vessels 30*b* and 30*c*, respectively. If $CF_4$ is used, the mixture is preferably 0.5–100% $CF_4$ and 0–99.5% helium. Alternative fluorine-containing gases may include $SiF_4$, $C_2F_6$, $BF_3$ and $C_3F_8$ or the like. The fluorine-containing process gas is provided to metal remover 2 (42*b*) by appropriate actuation of 3-way valves 44*a*–*d*, 36*b* and 38*b* and effective amounts of transition metal impurities are removed (see equations 3–16 above, for example) from the fluorinated process gas by adsorption. After being purified, the fluorine-containing process gas is provided to the chamber 52 of the furnace 48 such that the soot preform 50 is doped with an effective amount of fluorine. Fluorine is an effective down-dopant (refractive index decreasing dopant) that is conventionally used in optical fiber preform manufacture to reduce the refractive index of the optical fiber drawn from the preform relative to another segment of the fiber (e.g., relative to the core or cladding). The fluorine-containing gas is provided to the preform for between about 0.2 and 10 hours and the furnace temperature is between about 1100 and 1600° C.

The metal remover 40 preferably comprises an assembly of at least two metal removers, the first 42*a*, for example, receiving process gas directed from a first source (for example, a chlorinated gas source) and the second 42*b* receiving gas from a second source (for example, a fluorinated gas source). The use of two metal removers 42*a*, 52*b* arranged in parallel relation (receiving flow in parallel channels), for example, allows rapid conversion between gas sources. For example, of only one metal remover were used, it would take several hours, depending upon the gas, flow rates and amount and type of adsorbent material used to convert to a new process gas. This is because it takes a certain amount of exposure time to activate the adsorber with a different process gas before the adsorption process would be fully effective at removing unwanted metal contaminants. By using multiple metal removers, each one can be pre-activated, thereby being ready and waiting for receiving a particular pre-designated process gas. Therefore, minimal time disruptions are encountered upon switching to any new process gas, such as for example when switching from a drying gas to a doping gas or a consolidation gas. Thus, for example, as the process gas is switched from a drying gas, such as $Cl_2$, to a dopant gas, the process gas would first be directed to metal remover 1 42*a* which effectively purifies, by adsorption, the drying gas. Then, as the process gas is switched to a dopant gas, the valves 44*a–d* would be actuated to flow the gas to metal remover 2 42*b* as the dopant gas is flowed. In accordance with another embodiment, the metal removing adsorber may be pre-activated to enable efficient removal a mixture of process gas, such as a mixture of chlorinated gas and inert gas or a mixture of fluorinated and inert gas.

A third metal remover 42*c* may be preferably connected to the process gas source 28 and operates to purify another gas (e.g., an inert gas) from the process gas source 28 in supply line 33*b*. Appropriate control of valves 36*a–c*, MFCs 38*a*–38*c* and valves 44*a*, 44*d* channels flow of the inert gas from the tank 30*b* through metal remover 3 (42*c*). This purified inert gas is preferably used as a consolidation gas in the furnace 48 during the final step of consolidating and vitrifying the preform 50 or as a purge gas. Helium is preferred because of its excellent heat transfer properties, although argon may be used alternatively.

In more detail, the purifying steps described above are preferably accomplished by an adsorption process which is best achieved by passing the preferred process gas (drying, dopant or consolidation gas) through a porous media contained in the metal remover 40 thereby promoting adsorption. The porous media, in several embodiments, preferably comprises an oxide, such as MgO (magnesium oxide), CaO (calcium oxide), $ZrO_2$ (zirconium oxide—sometimes referred to as baddeleyite), $B_2O_3$ (boric oxide), $Al_2O_3$ (aluminum oxide), $SiO_2$ (silica oxide), Ti $O_2$ (titanium oxide), and $P_2O_5$ (phosphorous oxide—otherwise referred to a phosphorous anhydride). More preferably, the adsorbent material includes a metal oxide, wherein the metal is selected from the group consisting of metals from Group IA, IIA, IIIB, IVB of the periodic table of elements, and Zr, B, Al, Si and P. In certain preferred embodiments, the porous media adsorbent includes a metal oxide, wherein the metal is selected from the group consisting of Mg, Ca, Al, Si, Ti and Zr. Most preferred examples of metal oxides used as the adsorbent are MgO, CaO, $SiO_2$ and $Al_2O_3$.

More preferably yet, the adsorbent may be a silicate, such as, for example, $TiO_2.SiO_2$ (titanium silicate), $ZrO_2.SiO_2$ (zirconium silicate), $MgO.SiO_2$ (magnesium silicate), or the like.

Zeolites have been found to be particularly effective in purifying the process gas and removing gaseous metal impurities therein. Preferred zeolites include hydrated alumina silicate ($Al_2O_3.SiO_2$), calcium silicate ($CaO.SiO_2$), or sodium silicate ($Na_2O.SiO_2$) wherein the ratio of silica to the other cations may vary from 500:1 to 1:1. Preferred zeolites include the ZSM series zeolite (Example ZSM-5).

The adsorption purification step preferably occurs at a temperature below 200° C.; most preferably at approximately room temperature. Passing the process gas through the preferably porous adsorbent material causes removal of amounts of gaseous transition metal impurities contained therein, such as for example metal chlorides, where the metal is, for example, iron, nickel, chromium, copper, or the like. In particular, the impurities removed preferably include one or more gaseous compounds selected from the group of an iron-containing compound, a nickel-containing compound, a chromium-containing compound, and a copper-containing compound. Once purified, it is believed that the purified gas has less than 5 ppb metal impurities; more preferably less than 1 ppb metal impurities.

Advantageously, purifying the process gas to remove transition metal impurities therein prior to introducing the process gas to the furnace 48 may reduce the attenuation of the optical fiber produced therefrom. Preferably, the purifying step takes place as adsorption without causing a chemical conversion reaction. By the phrase "chemical conversion reaction" what is meant is converting the process gas from one chemical form to another. In particular, the preferable process gas is either a drying gas or dopant gas and is a halogen-containing gas selected from the group consisting of a chlorine-containing gas and a fluorine-containing gas. Suitable examples of chlorine-containing gases include $Cl_2$, $SiCl_4$, $GeCl_4$, $COCl_2$, $SOCl_2$, with $POCl_3$, with $Cl_2$ being most preferred. Suitable examples of fluorine-containing gases include $CF_4$, $SiF_4$, $C_2F_6$, $BF_3$, $C_3F_{8,\ NF3}$ and $F_2$, with $CF_4$ and $SiF_4$ being most preferred.

Table 1 below illustrates experimental data (at various wavelengths) illustrating the reduction in attenuation (in dB/km) when comparing optical fiber drawn without metal removers and optical fiber drawn employing the metal removing apparatus and method in accordance with the invention being employed.

TABLE 1

Experimental Results of Drawn Optical Fiber

| Example | 1310 nm | 1383 nm | 1410 nm | 1550 nm |
|---|---|---|---|---|
| Reduction (dB/km) | 0.00085 | 0.00552 | 0.00213 | 0.00044 |

As can be seen from the data above, at every wavelength there is a demonstrated decrease in the attenuation (in dB/km) of the optical fiber drawn from the preform that has been manufactured in accordance with the method and apparatus of the invention. In particular, the reduction is more than 0.0008 dB/m for all wavelengths measured and as high as 0.005 dB/m at 1383 nm. It is believed by the inventors that the reductions shown are mostly attributable to removal of iron containing contaminant gases in the process gases supplied.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method of manufacturing an optical fiber preform, comprising the steps of:

providing a process gas, purifying the process gas, by adsorption, to remove transition metal impurities therein without causing a chemical conversion reaction during purifying, and exposing, in a furnace, an optical fiber soot preform to the purified gas.

2. The method of claim 1 wherein the step of exposing is accomplished during the process of drying, doping or consolidating.

3. The method of claim 1 wherein the process gas purified further comprises a halogen-containing gas.

4. The method of claim 3 further comprising a step of routing the halogen-containing gas through a distributor apparatus prior to the step of purifying.

5. The method of claim 3 wherein the halogen-containing gas is selected from the group consisting of:

a chlorine-containing gas, and a fluorine-containing gas.

6. The method of claim 3 wherein the halogen-containing gas is mixed with an inert gas prior to purification.

7. The method of claim 3 wherein the process gas is a halogen-containing gas selected from the group consisting of $Cl_2$, $SiCl_4$, $GeCl_4$, $POCl_3$, $COCl_2$, $SOCl_2$, $CF_4$, $SiF_4$, $C_2F_6$, $BF_3$, and $C_3F_8$.

8. The method of claim 1 wherein the process gas is a chlorinated gas selected from the group consisting of $Cl_2$, $SiCl_4$, $GeCl_4$, $POCl_3$, $COCl_2$, and $SOCl_2$.

9. The method of claim 1 wherein the step of purifying removes at least one impurity selected from the group consisting of an iron-containing compound, a nickel-containing compound, chromium-containing compound, and copper-containing compound.

10. The method of claim 9 wherein the impurity is a metal chloride.

11. The method of claim 1 further comprising a step of routing through a distributor apparatus to control the flow rate of the process gas.

12. The method of claim 1 wherein the step of purifying comprises passing the process gas through a porous media.

13. The method of claim 12 wherein the porous media comprises a zeolite.

14. The method of claim 12 wherein the porous media comprises an oxide.

15. The method of claim 14 further comprising a metal oxide wherein the metal is selected from the group consisting of metals from Group IA, IIA, IIIB, IVB, Zn, B, Al, Si and P.

16. The method of claim 14 wherein the porous media comprises a metal oxide wherein the metal is selected from the group consisting of Mg, Ca, Al, Si, Ti and Zr.

17. The method of claim 1 wherein the step of purifying takes place at a temperature of below about 200° C.

18. A optical fiber preform manufacturing apparatus, comprising:

a source of process gas, a metal removing adsorber connected the source and adapted to purify the process gas and remove transition metal impurities therein without causing a chemical conversion reaction, and a consolidation furnace connected to the metal remover, the furnace adapted to contain a soot preform.

19. The apparatus of claim 18 wherein the process gas comprises a halogen-containing gas.

20. The apparatus of claim 18 further comprising a distributor connected to the source, the distributor operable to control a flow rate of the process gas.

21. The apparatus of claim 18 wherein the metal removing adsorber comprises a porous media.

22. The apparatus of claim 21 wherein the porous media comprises a metal oxide.

23. The apparatus of claim 22 wherein the metal in the metal oxide is selected from the group consisting of Mg, Ca, Al, Si, Ti, and Zr.

24. The apparatus of claim 18 wherein the metal removing adsorber comprises an assembly of at least two metal removers arranged in parallel relation.

25. The method of claim 24 wherein a first gas from the source is directed to a first one of the at least two metal removers and a second gas from the source is directed to a second one of the at least two metal removers.

26. The method of claim 25 wherein the first gas includes a chlorinated gas and the second gas includes a fluorinated gas.

27. The method of claim 25 wherein the first gas includes a chlorinated gas and a second gas includes an inert gas.

28. The method of claim 25 further comprising a third metal remover connected to a third gas from the source.

29. A method of manufacturing an optical fiber preform, comprising the steps of:

providing a chlorinated process gas where chlorine is the only halogen, purifying, by adsorption, the chlorinated process gas to remove gaseous transition metal impurities therein without causing a chemical conversion reaction during purifying, and exposing, in a furnace, an optical fiber soot preform to the purified process gas to dry or dope the soot preform.

* * * * *